United States Patent
Choi et al.

(10) Patent No.: US 9,612,816 B2
(45) Date of Patent: Apr. 4, 2017

(54) METHOD FOR OPERATING SOFTWARE DEFINED RADIO APPLICATION

(71) Applicant: INDUSTRY-UNIVERSITY COOPERATION FOUNDATION HANYANG UNIVERSITY, Seoul (KR)

(72) Inventors: Seung Won Choi, Seoul (CN); Chi Young Ahn, Bucheon-si (KR); Hyun Wook Yang, Seoul (KR); June Kim, Incheon (KR); Yong Jin, Seoul (KR); Dong Hyun Kuem, Siheung-si (KR); Sae Hee Bang, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 407 days.

(21) Appl. No.: 14/391,873

(22) PCT Filed: Apr. 12, 2013

(86) PCT No.: PCT/KR2013/003075
§ 371 (c)(1),
(2) Date: Oct. 10, 2014

(87) PCT Pub. No.: WO2013/154380
PCT Pub. Date: Oct. 17, 2013

(65) Prior Publication Data
US 2015/0326434 A1    Nov. 12, 2015

(30) Foreign Application Priority Data

Apr. 12, 2012  (KR) .................. 10-2012-0038045
Apr. 12, 2012  (KR) .................. 10-2012-0038062

(Continued)

(51) Int. Cl.
*H04B 1/18*       (2006.01)
*G06F 9/445*    (2006.01)
(Continued)

(52) U.S. Cl.
CPC ............ *G06F 8/61* (2013.01); *G06F 9/45558* (2013.01); *H04B 1/0003* (2013.01);
(Continued)

(58) Field of Classification Search
CPC ...................................... H04B 1/0003–1/0035
See application file for complete search history.

(56) References Cited

U.S. PATENT DOCUMENTS 8,103,213 B2    1/2012  Tolonen
2007/0248054 A1*  10/2007  Chen ....................... H04W 8/06
370/331

(Continued)

FOREIGN PATENT DOCUMENTS

KR          10-0696944 B1      3/2007
KR        1020070115522 A     12/2007
(Continued)

OTHER PUBLICATIONS

International Search Report dated Jul. 26, 2013; PCT/KR2013/003075.

*Primary Examiner* — Brendan Higa
(74) *Attorney, Agent, or Firm* — Ladas & Parry LLP

(57) ABSTRACT

Disclosed is a structure for operating a unified radio application for a software defined radio terminal. The structure for operating a unified radio application according to the present invention can be classified into two types depending on whether a configuration code (configcode) of the radio application is constituted by an executable code or implemented in an intermediate representation (IR) code. With the structure for operating a unified radio application according (Continued)

to the present invention, it is possible to develop and distribute a radio application capable of operating on all radio platforms.

15 Claims, 18 Drawing Sheets

(30) Foreign Application Priority Data

| | | |
|---|---|---|
| Jun. 14, 2012 | (KR) | 10-2012-0063560 |
| Aug. 17, 2012 | (KR) | 10-2012-0089785 |
| Aug. 20, 2012 | (KR) | 10-2012-0090453 |
| Oct. 4, 2012 | (KR) | 10-2012-0109783 |
| Oct. 25, 2012 | (KR) | 10-2012-0119188 |
| Dec. 6, 2012 | (KR) | 10-2012-0141470 |

(51) Int. Cl.
*H04L 12/24* (2006.01)
*G06F 9/455* (2006.01)
*H04B 1/00* (2006.01)

(52) U.S. Cl.
CPC ........ *H04L 41/082* (2013.01); *H04L 41/0816* (2013.01); *G06F 2009/45595* (2013.01)

(56) References Cited

U.S. PATENT DOCUMENTS

| | | | |
|---|---|---|---|
| 2010/0304770 A1 | 12/2010 | Wietfeldt et al. | |
| 2011/0202301 A1 | 8/2011 | Kim et al. | |
| 2012/0264470 A1* | 10/2012 | Bajj | H04W 84/045 455/509 |
| 2013/0022157 A1* | 1/2013 | Hollevoet | H04B 1/0003 375/343 |

FOREIGN PATENT DOCUMENTS

| | | |
|---|---|---|
| KR | 20090065329 A | 6/2009 |
| KR | 20110042224 A | 4/2011 |

\* cited by examiner

METHOD FOR OPERATING SOFTWARE DEFINED RADIO APPLICATION

TECHNICAL FIELD

The present invention relates to operational structures of radio applications for a software-defined radio (SDR) terminal, and more specifically to operational structures of unified radio applications which have hardware-independency and can be developed as corresponding to various radio platforms.

BACKGROUND ART

The technologies of the present invention may cover software define radio, digital radio communications, baseband processors, application processors, application stores, long term evolution (LTE), worldwide interoperability for microwave (WiMax), and radio applications.

In the present invention, various radio applications such as LTE, WiMax, wireless microphone, walkie-talkie, etc. can be downloaded from application stores and installed into a cellular phone so that the cellular phone can be changed into an LTE terminal or a WiMax terminal, or can be used as a wireless microphone, a walkie-talkie, etc. Therefore, the present invention may be applied to smart phones which need to support various radio access technologies such as LTE, wideband code division multiple access (WCDMA), and WIFI.

In connection with the software defined radio (SDR) technology, there exists a software communication architecture (SCA) which is a defacto standard technology. It may comprise specifications related to frameworks for SDR, middleware, and real-time operating system (OS), which guarantees compatibility of interfaces between SDR systems. The core of SCA is a core framework which is a framework specification. In the core framework, various parts constituting radio applications are componentized and the components may be reused and assembled so as to create a new radio application.

In case of SCA, it is possible to make rearrangement of blocks which are already installed in a terminal. However, user-defined blocks to be used for a specific radio application cannot be installed even into SCA compatible terminals having different hardware configurations. Thus, single executable codes cannot be used for all SCA compatible terminals. This means that executable codes optimized for each hardware configuration on which each SCA compatible terminal is based should be respectively created and distributed. This demands very much time and cost, and makes commercial uses of radio applications difficult, Also, it does not provide baseband application programming interface (API) for implementation of radio applications, and accordingly it makes selective utilization of hardware acceleration functions difficult.

DISCLOSURE

Technical Problem

The purpose of the present invention for resolving the above-described problems is to provide operational structures of unified radio applications which can be freely developed, distributed, installed, and executed as corresponding to various radio platforms.

Technical Solution

In some example embodiments of the present invention, a method of operating a radio application in a radio processor layer of a terminal having a radio processor, the method may comprise determining whether a shadow radio platform to which the radio application is targeted is identical to a real radio platform of the terminal; and executing configuration codes of the radio application in the radio processor when the shadow radio platform is identical to the real radio platform of the terminal.

Here, the configuration codes may include user-defined function block codes for configuring user-defined function blocks of the radio application, and a radio library for configuring standard function blocks used by the radio application in form of execution codes executable on the real radio platform.

Also, at least part of the standard function blocks may be implemented as dedicated hardware logics executed by the radio application through a hardware abstraction layer (HAL) of the radio processor layer.

Here, the method may further comprise downloading a radio application package including the configuration codes of the radio application from a server.

Here, the radio application may operate on at least one of the radio processor and an application processor of the terminal and interwork with a radio control framework providing the radio application with operation environments.

Also, the radio control framework includes at least one of: a configuration manager (CM) performing installation/un-installation of the radio application and creating/deleting an instance of the radio application and managing radio parameters for the radio application; a radio connection manager (RCM) performing activation/deactivation of the radio application and managing user data flow switching between radio applications; a flow controller (FC) controlling sending/receiving and flows of user data packets; a multi-radio controller (MRC) scheduling requests for spectrum resources issued by radio applications; and a resource manager (RM) sharing radio resources with radio applications.

In other example embodiments of the present invention, a method of operating a radio application in a radio processor layer of a terminal having a radio processor, the method may comprise determining whether a shadow radio platform to which the radio application is targeted is identical to a real radio platform of the terminal; and executing configuration codes of the radio application in the radio processor by compiling the configuration codes through a radio virtual machine (RVM) when the shadow radio platform is different from the real radio platform of the terminal.

Here, the configuration codes may include user-defined function block codes for configuring user-defined function blocks of the radio application in intermediate representation (IR) form which can be converted into execution codes executable on the real radio platform.

Here, the RVM may include a just-in-time (JIT) compiler or which compiles the configuration codes into execution codes of the real radio platform.

Here, the RVM may include an ahead-of-time (AOT) compiler which compiles the configuration codes into execution codes of the real radio platform.

Here, the terminal may have native implementations of standard function blocks in the radio processor layer.

Here, the terminal may have standard function blocks implemented as dedicated hardware logics executed by the radio application through a hardware abstraction layer (HAL) of the radio processor layer.

Here, the method may further comprise downloading a radio application package including the configuration codes of the radio application from a server.

Here, the radio application may operate on at least one of the radio processor and an application processor of the terminal and interwork with a radio control framework providing the radio application with operation environments.

Here, the radio control framework may include at least one of: a configuration manager (CM) performing installation/uninstallation of the radio application and creating/deleting an instance of the radio application and managing radio parameters for the radio application; a radio connection manager (RCM) performing activation/deactivation of the radio application and managing user data flow switching between radio applications; a flow controller (FC) controlling sending/receiving and flows of user data packets; a multi-radio controller (MRC) scheduling requests for spectrum resources issued by radio applications; and a resource manager (RM) sharing radio resources with radio applications.

Advantageous Effects

Using the operational structures of unified radio applications according to the present invention, it can become possible to develop and distribute radio applications which can be executed in various radio platforms. Therefore, a new business model in which radio applications are commercially traded may be created.

In addition, in aspect of mobile operators, it may become possible to switch radio access technologies of which terminals based on various radio platforms that subscribers are using into desired radio access technologies according to their needs so that flexible operation of mobile networks may be possible.

In addition, in aspect of subscribers, it may become possible that they can use new radio access technologies only by downing a radio application package for a desired radio application and installing the desired radio application in their terminals without purchasing new terminals.

BEST MODE

Figure 1:
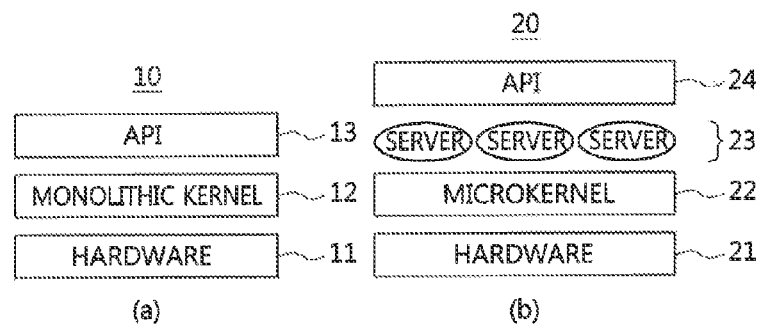
FIG. 1 is a block diagram illustrating a monolithic kernel and a micro kernel constituting a part of operational structure of unified radio applications according to example embodiments of the present invention.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. In describing the invention, to facilitate the entire understanding of the invention, like numbers refer to like elements throughout the description of the figures, and a repetitive description on the same element is not provided.

Terminologies used for explaining the present invention are defined as follows. Other terminologies except the following terminologies will be defined in the corresponding parts of the present specification.

Radio Application (RA): an application which provides a radio communication environment independent on specific hardware configurations and user applications according to a distribution/installation/operation framework of the present invention. The radio application may be executed on a radio processor. Alternatively, the radio application may be configured to comprise a part which is executed on a radio processor and a part which is executed on an application processor, and to operate on the two processors. The radio application may comprise a radio controller and function blocks. The function blocks may include standard function blocks and user defined function blocks.

Radio Application Package (RAP): As a distribution form of a radio application, a RAP may include a radio controller and function blocks which are components of the radio application, and also include pipeline configuration metadata. In addition, the radio application package may further include a radio library.

Standard Function Block (SFB): It is a standardized function block each of which has a standardized function and a standardized function name used for calling the function. In case that radio platform chip vendors develop the standard function blocks, the standard function blocks may be a set of function blocks implemented by the vendors, and may be provided with a driver used for driving the blocks. The standard function blocks may be implemented by using a dedicated hardware accelerator, or implemented as executable codes to be executed on a radio processor core. If the standard function blocks are implemented as executable codes to be executed on a radio processor core, a set of the standard function blocks may be referred to as a radio library. Each of the standard function blocks has standardized name and feature for its function, and may be defined by using a standard baseband Application Programming Interface (API) header.

User-Defined Function Block (UDFB): It is a function block which can be provided by radio application providers. A UDF may have a function which is not provided as a standard function block or a function which is customized from an existing standard function block. It may be implemented to be executed on a radio processor core. The user-defined function blocks may be provided in forms of executable codes, source codes, or intermediate representation (IR) codes.

User Defined Function Block (UDFB) set: A set of user-defined function blocks which are provided by radio application providers.

Radio Hardware Abstract Layer (HAL): It is a layer abstracting various kinds of hardware in aspect of an operating system (OS). Since standardized abstract interfaces of accelerator are independent on hardware, HAL enables OS to access all types of hardware. A role of HAL is similar to a role of driver. However, HAL is included in OS differently from drivers which may change according to hardware changes.

Radio Platform Driver: It is software needed for OS to recognize hardware. This is software matching OS instructions which are independent on hardware with hardware-instructions, and may act as a usual hardware driver.

FIG. 1 is a block diagram illustrating a monolithic kernel and a micro kernel constituting a part of operational structure of unified radio applications according to example embodiments of the present invention.

Referring to FIG. 1, a monolithic kernel is a kernel to which all necessary functions are integrated. Since all necessary functions exist in the same memory space, each of the functions provided by the kernel may be accessed by using a function call method. Thus, its implementation can be simplified, and system resources can be efficiently utilized. However, it is difficult that the implemented kernel is not easily ported to various hardware environments or different systems. Also, when its functions are extended, a size of the kernel may become too large, and management of the kernel may become difficult.

Also, referring to FIG. 1, a micro kernel is a kernel in which necessary functions are designed as small server modules and only minimum functions for managing the server modules are implemented as a core part of the kernel. This type of kernel has advantages that expansion and reconfiguration of its functions are easy and it can be easily reused by other systems. However, since frequent message exchanges and context switching may occur during a procedure of using services, there is a shortcoming that its working speed may become relatively lower.

Configuration and Software Architecture of a Radio Application

Figure 2:
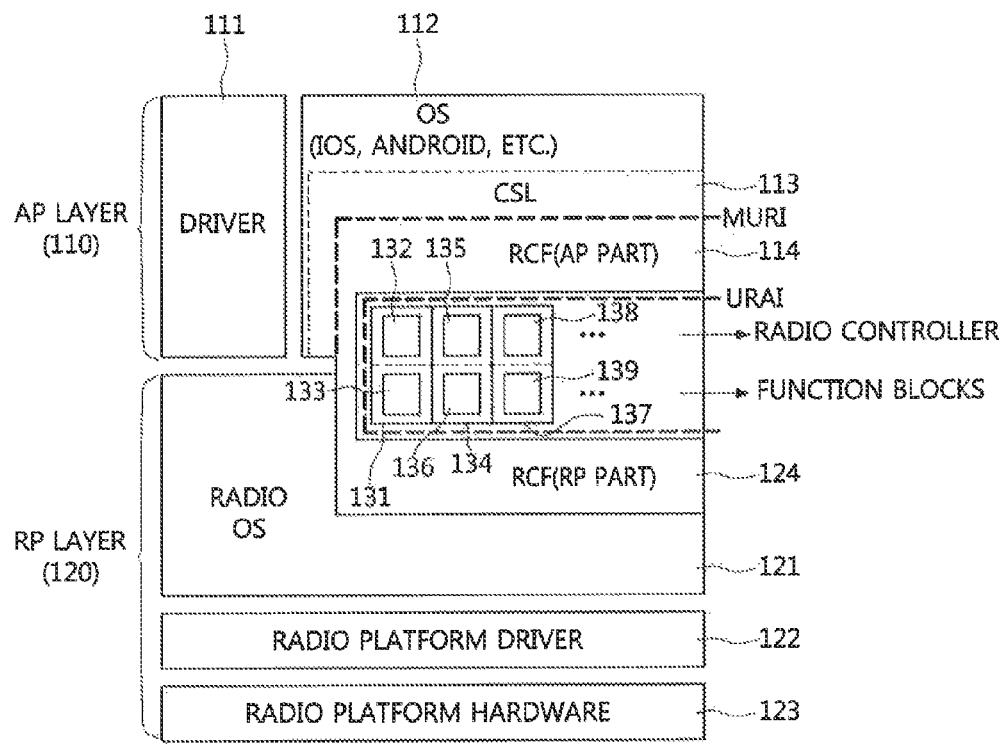
FIGS. 2 and 3 are block diagrams to explain a software architecture environment on which a radio application according to the present invention is executed.
Figure 3:
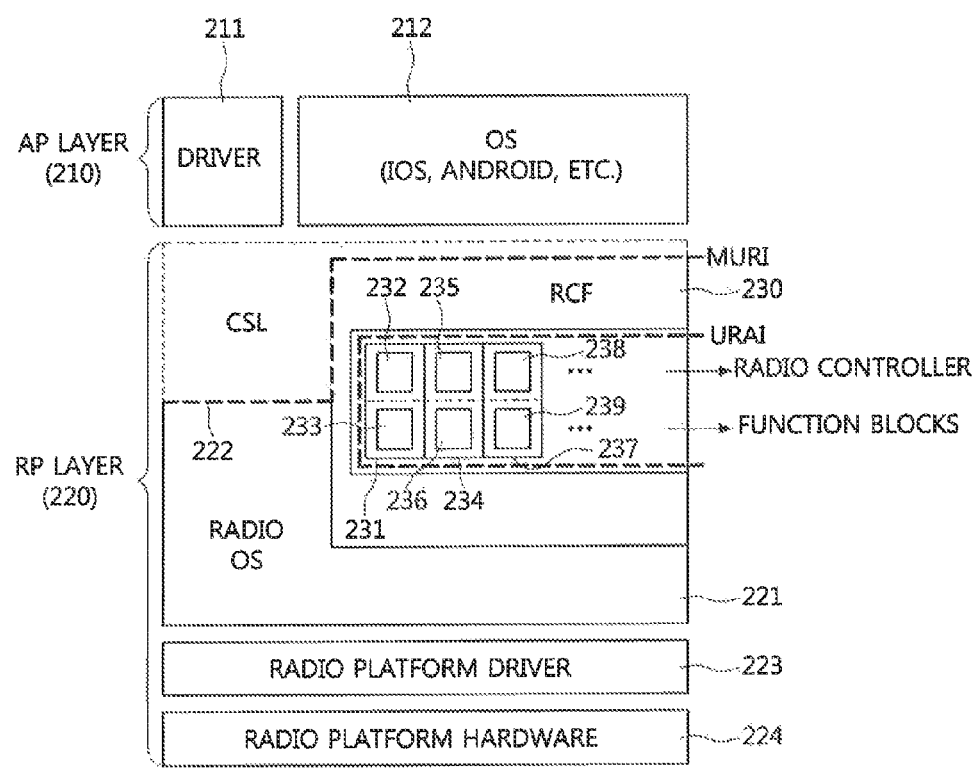

FIGS. 2 and 3 are block diagrams to explain a software architecture environment on which a radio application according to the present invention is executed.

Referring to FIG. 2 and FIG. 3, a software architecture according to the present invention may comprise an application processor layer 110 which operates on an application processor (AP) and a radio processor layer 120 which operates on a radio processor (RP). Here, the radio processor may be also referred to as a baseband processor (BP).

FIG. 2 illustrates a software architecture environment where a radio control framework (RCF), which is described later, is divided into two parts—a part being executed on the AP (referred to as an application processor layer part) and a part being executed on the RP (referred to as a radio processor layer part), and executed on the two processors. Also, FIG. 3 illustrates a software architecture environment where a RCF is executed only on the radio processor.

A non-real time OS such as Andriod OS of Google, iOS of Apple, etc. may operate on the AP, and a real time OS (hereinafter, referred to as a 'radio OS') may operate on the RP. Hereinafter, for clear discrimination, the non-real time OS operating on the AP layer may be referred to as 'OS', and the real time OS operating on the RP layer may be referred to as 'radio OS'.

Hereinafter, the AP layer, the RP layer, and components constituting the radio control framework will be described in detail.

(1) Application Processor Layer

The AP layer comprises the following components, as shown in FIG. 2 and FIG. 3.

Driver 111, 211: They drive hardware devices (e.g. camera, speaker, etc.) on a given OS.

OS 112, 212: Non-real time OS (e.g. Android and iOS) operating in general mobile devices.

If the radio control framework is configured to operate on the AP and the RP both (as shown in FIG. 2), an AP layer part 114 of the radio control framework may exist on the OS. If the radio control framework is configured to operate only on the RP (as shown in FIG. 3), the radio control framework does not exist on the AP layer.

If the radio control frame work operates on both the processors (a composition of FIG. 2), a communication service layer 113 may exist on the OS of the AP.

The communication service layer may be a layer providing at least some of the following three services to the radio control framework.

The first service is related to an administrative. It may be a service related to installation/uninstallation of radio applications, creating/deleting instances of radio applications, and acquisition of a list of radio applications in each status (installed, instanced, activated).

The second service is related to connection control. It may be a service related to activation/deactivation of radio applications, creation of data flow, creation of network allocation, and acquisition of a list of radio applications in each status (installed, instanced, activated).

Lastly, the third service is related to data flow. That is, this service is a service related to sending/receiving user data.

As an example of communication service layer configurations for providing at least some of the above-described three services, the communication service layer may be configured to comprise an administrator application, a mobility policy manager application, a networking stack (i.e. a protocol stack operating on the communication service layer), and a monitor application.

However, the communication service layer may comprise only some of the above-described components, or may further comprise additional components as well as the above-described components. Also, one or more components among the above components may be integrated into a single component existing within the communication service layer. Also, the above-described components are only examples of components which the communication service layer can comprise in order to support services which should be performed by the communication service layer. That is, the communication service layer may be defined based on functions performed by it. The above-described exemplary composition of components does not restrict composition of the communication service layer.

In the configuration in which the radio control framework operates on both the AP and the RP (the composition of FIG. 2), radio applications 131, 134, and 137 to which distribution/installation/operation methods according to the present invention are applied may respectively comprise AP layer parts 132, 135, and 138 and RP layer parts 133, 136, and 139. A radio controller (RC) which is the AP layer part of radio application may be configured to transmit context information to a monitor application of the communication service layer, transmit data to a networking stack of the communication service layer, and receive data from the networking stack.

(2) Radio Processor Layer

The RP layer comprises the following components, as shown in FIG. 2 and FIG. 3.

Radio operating systems 121 and 221 are real time operation systems

If the radio control framework is configured to operate on the AP and the RP both (as shown in FIG. 2), a RP layer part 124 of the radio control framework may exist on the radio OS. If the radio control frame work operates only on the RP (as shown in FIG. 3), the radio control framework does not exist on the AP layer. That is, the radio control framework exists only on the RP layer.

If the radio control frame work exists only on the RP (as shown in FIG. 3), the communication service layer 222 exists only on the radio OS 221 differently from the case illustrated in FIG. 2.

Since role and configuration of the communication service layer 222 illustrated in FIG. 3 are identical to those of the communication service layer 113 illustrated in FIG. 2, redundant explanations are omitted.

Radio platform drivers 122 and 223 are components demanded for the radio OS to recognize a hardware radio platform similarly to usual hardware drivers.

Radio platform hardware 123 and 224 may be configured as core(s) of the radio processor and baseband accelerators The baseband accelerators prepared for the standard function block(s) may usually be provided in form of application-specific integrated circuit (ASIC).

If the radio control framework is configured to operate only on the radio processor (i.e. a configuration shown in FIG. 3), radio applications 231, 234, and 237 which are targets of distribution, installation, and operation methods according to the present invention may be executed on the radio processor layer.

Radio controllers 132, 135, and 138 of respective radio applications may be configured to transmit context information to a monitor application of the communication service layer, transmit data to a networking stack of the communication service layer, and receive data from the networking stack.

A multi-radio interface (MURI) is an interface between the communication service layer and the control framework, and a unified radio application interface (URAI) is an interface between the radio application and the control framework.

A radio application is an application enabling communications of a mobile terminal, and may be distributed in form of a radio application package. Components of a radio application package may be configured as follows.

1) User Defined Function Block (UDFB)
2) Pipeline configuration metadata
3) Radio controller code (RC code)
4) Radio library—a radio library is distributed in form of executable codes as included in a radio application package, when the standard function blocks (SFB) are distributed as executable codes.

The radio application package may be downloaded onto the OS of the application processor layer, and the user-defined function block codes and the radio library may be loaded from the application processor to the radio processor by referring to the pipeline configuration metadata, and finally loaded to the radio OS on the radio processor layer.

(3) Radio Control Framework

The radio control framework (RCF) 130 or 230 is a component for providing operation environment of radio applications.

If the radio control framework is configured to operate on the AP and the RP both (as shown in FIG. 2), components of the radio control framework may be classified into two groups 114 and 124. That is, one group operates on the AP, and other group operates on the RP. It may be determined differently according to each vendor which components of the RCF operate on the RP (i.e. in real-time) and which components of the RCF operate on the AP (i.e. in non-real-time).

If the radio control framework is configured to operate only on the RP (i.e. a configuration of FIG. 3), the radio control framework exists only on the RP layer without discrimination of a RP layer part and an AP layer part.

Basically, the RCF may include at least some of the following 5 components for managing radio applications.

However, the radio control framework may comprise only some of the following 5 components, and may further comprise additional components as well as the following 5 components. Also, one or more components among the following components may be integrated into a single component existing within the radio control framework.

The role of the radio control framework may be defined based on functions performed by the components which will be described. The following exemplary components do not restrict composition of the radio control framework. That is, the radio control framework may have various configurations at least some of functions of the following components.

1) Configuration Manager (CM): Installation/uninstallation and creating/deleting instance of radio applications into RP as well as access management of radio parameters for radio applications.

2) Radio Connection Manager (RCM): Activation/deactivation of RAs according to user requests, and overall management of user data flows, which can also be switched from one RA to another.

3) Flow Controller (FC): Sending and receiving of user data packets and controlling the flow of signaling packets.

4) Multiradio Controller (MRC): Scheduling the requests for radio resources issued by concurrently executing RAs and detecting and managing the interoperability problems among the concurrently executing RAs.

5) Resource Manager (RM): Managing the computational resources to share them among simultaneously active RAs, and to guarantee their real-time requirements Software Architecture of Radio Processor Layer In the above descriptions, overall software architecture and operation environment of radio applications according to the present invention were explained. Hereinafter, provided are further detail explanations operational structures of radio applications within the radio processor layer.

If a radio application package is downloaded, user-defined function block code and radio library which should operate on the RP layer are installed so that they can be accessed in the RP layer.

Hereinafter, codes for configuring components which should be executed on the RP layer, including the above-described user-defined function block code, may be referred to as configuration code (or, 'configcodes'). Configcodes may include only user-defined function block code, or may include radio library as well as the user-defined function block code. Configcodes may be in form of executable codes or Intermediate Representation (IR).

Also, hereinafter, a real radio platform is defined as a target radio platform, and a concept of a shadow radio platform is defined as a virtual entity having hardware abstraction on the target radio platform. That is, a shadow radio platform may mean a virtual radio platform into which developers of radio applications virtualize an operation environment of radio applications. For example, a shadow radio platform may be equal to or different from a target radio platform. If the Shadow radio platform is different from the target radio platform, the shadow radio platform may be understood as an abstract device independent of hardware. That is, the shadow radio platform may be a radio virtual machine (RVM).

If the shadow radio platform is different from the target radio platform so that the shadow radio platform becomes RVM, the RVM performs virtualization functions for helping the above-described configcodes to operate on the actual target radio platform. The implementation may include the Back-end Compiler which might provide Just-in-Time (JIT) or Ahead-of-Time (AOT) method for compilation of configcodes into executable codes of the target radio platform.

Figure 4:
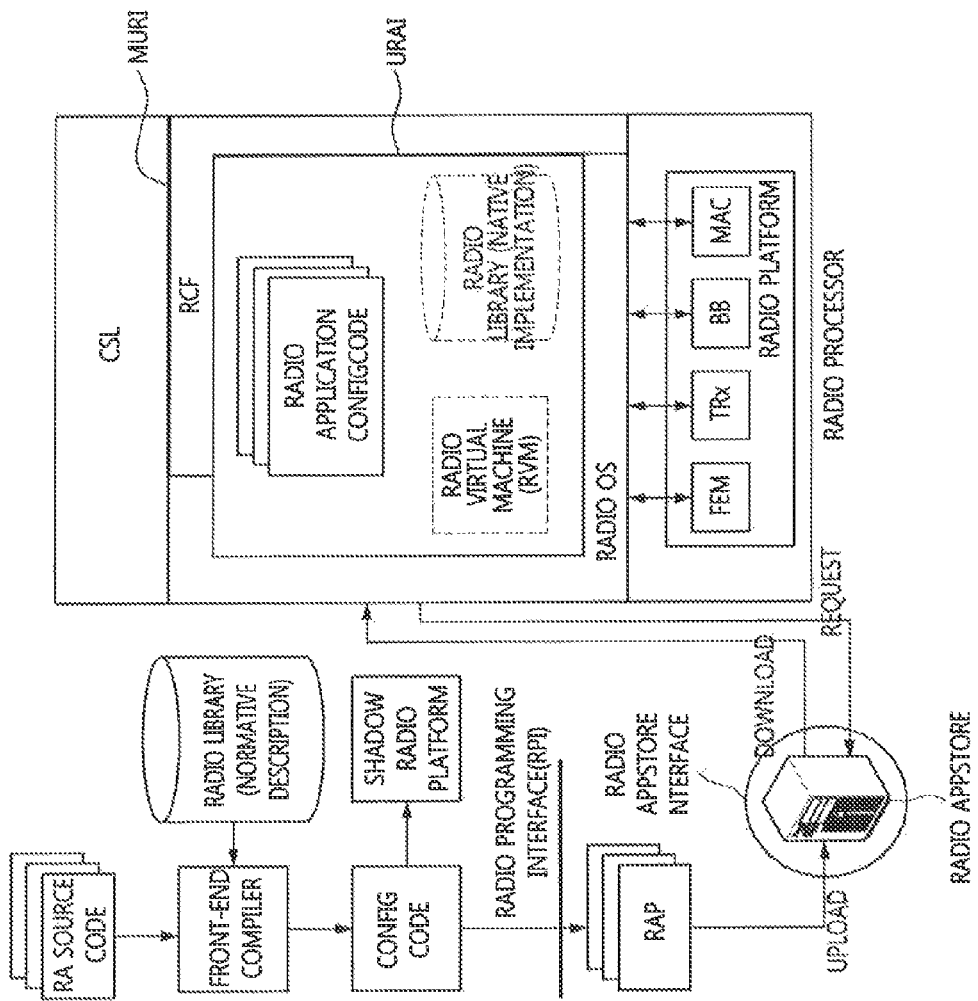
FIG. 4 is a conceptual diagram to explain a radio processor layer software architecture of radio applications according to the present invention.

FIG. 4 is a conceptual diagram to explain a radio processor layer software architecture of radio applications according to the present invention.

The radio process provides a mobile device with communication capabilities, and the software architecture for radio processor, which is illustrated in FIG. 4, may be configured to comprise the following components.

1) Radio OS

2) The RP layer part of RCF (when RCF is configured with the RP layer part and the AP layer part), or the entire RCF (when RCF is configured to operation only on the RP).

3) The communication service layer when RCF operates only on the RP (Although the communication service layer is illustrated as operating only on the RP in FIG. 4, the communication service layer may operate on the AP when RCF is configured to operate on both the RP and the AP).

4) Implementation of RVM when the shadow radio platform is RVM.

5) Native implementation of radio library (Radio Lib) when the shadow radio platform is RVM.

6) Configuration codes (configcodes) of radio applications—configcodes may be provided in form of executable codes of the target radio platform or platform-independent intermediate representation.

The configcodes are interpreted by RVM when the shadow radio platform is equal to RVM, or are equal to executable codes when RVM is equal to the target radio platform.

The RCF and its interfaces such as MURI and URAI have been already explained.

The shadow radio platform can be either RVM or a target radio platform. If the Shadow radio platform is equal to the target radio platform, then front-end compiler will generate executable code for the target radio platform and configcodes is equivalent to the executable code for that radio platform.

The RVM is an abstract machine which is capable of executing configcodes. It is independent of the hardware. The configcodes are executed on a target platform through a specific RVM. Thus, RVM includes a back-end compiler which might provide Just-in-Time (JIT) or Ahead-of-Time (AOT) method for compilation of configcodes into executable codes.

The radio library consists of function blocks representing the computational basis. The radio application can be expressed as a set of these interconnected function blocks.

Function blocks of the radio library are represented in the normative language of the radio platform. The native implementation of the radio library provides executable codes of function blocks from the library for the target platform. The radio library is extendable.

Operational Structure of Unified Radio Applications

Operational structure of unified radio applications may be represented considering two different cases. One case is when RA configcodes are executable on a target radio platform (illustrated in FIG. 5) and the other case is when RA configcodes are Intermediate Representation (IR) that is to be back-end compiled at a given mobile device (illustrated in FIG. 6).

Figure 5:
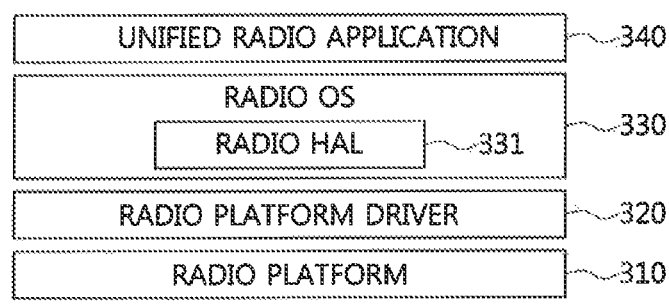
FIG. 5 is a hierarchical structure diagram to explain an example of operational structures of unified radio applications according to the present invention.
Figure 6:
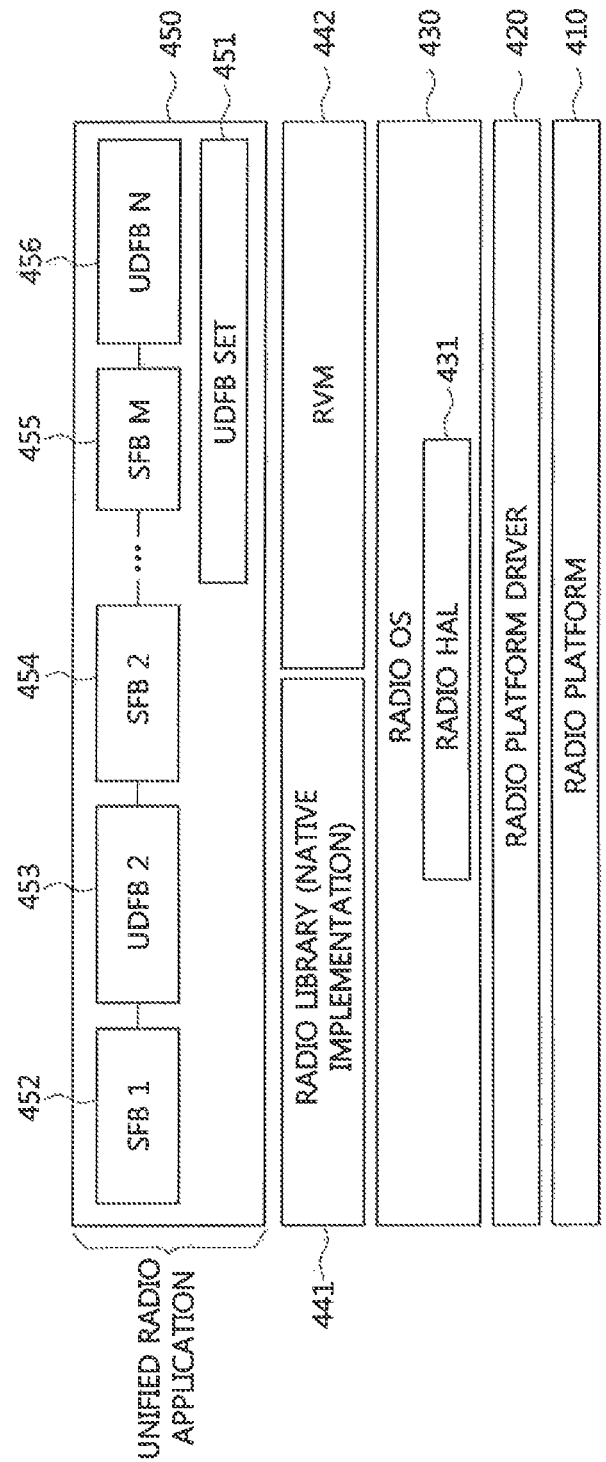
FIG. 6 is a hierarchical structure diagram to explain another example of operational structures of unified radio applications according to the present invention.

FIG. 5 is a hierarchy structure diagram to explain an example of operational structure of unified radio applications according to the present invention, and FIG. 6 is a hierarchy structure diagram to explain another example of operational structure of unified radio applications according to the present invention.

Referring to FIG. 5, a radio and user-defined function blocks (UDFB) library needed for execution of a given radio application are included in executable configcodes of the radio application.

Meanwhile, referring to FIG. 6, user-defined function blocks needed for execution of a given radio application are included in the configcodes of the radio application, and should be back-end compiled by RVM shown in FIG. 4. In this case, since the radio library cannot be included in the radio application configcodes, a native implementation of the radio library should be additionally prepared in a given mobile device. Usually the native implementation of the radio library is provided by a core chip vendor because the radio library includes standard function blocks (SFB) implemented on the core processor.

Basically, the radio library (i.e. native implementation), which can be implemented without dedicated hardware accelerator(s), are necessary for enhancing speed of the standard function blocks and for generating other standard function blocks by combining accelerator(s) and program codes.

For both a case when the radio application configcodes are executable codes and a case when the radio application configcodes are intermediate representation, the standard function blocks are supported by dedicated hardware logic accelerator(s) through the radio hardware abstract (HAL) layer shown in FIG. 5 and FIG. 6. That is, every time when the standard function blocks implemented using dedicated hardware logics are called by given radio application codes, the standard function blocks should be executed on the corresponding dedicated hardware logic accelerator(s) through the radio HAL, regardless of whether the radio application configcodes are executable codes or intermediate representation. As explained later, the radio HAL also includes hardware abstraction for interfaces prepared for user-defined function block library(s).

The standard function blocks may be function blocks which are commonly used by various radio applications, for example, a Fast Fourier Transform (FFT) block. Also, the standard function blocks may be function blocks which should be efficiently implemented using a special purpose accelerator in a given radio platform, for example, a turbo coder block.

On the other hand, a standard function block set (UDFB set) shown in FIG. 6 includes all user-defined function blocks which are used by given radio application(s). It is important that any standard function block can be modified and/or extended by replacing it with a proper standard function block which is a modified and/or extended version of the standard function block to be replaced. Therefore, some user-defined function blocks can be good candidates for standard function block extension, which means they might be added as standard function blocks later. In that case, after addition, they will become atomic as the normal standard function blocks. Since the user-defined function block Set (UDFB set) is to be provided by radio application provider, i.e. 3rd party, instead of radio platform vendor, in order for radio control framework to be able to perform basic controls of every UDFB's event and/or command, a standard set of control interfaces such as "start", "stop", "pause", "get-port" and "initialize" may have to be specified for the corresponding user-defined function blocks. For this purpose, an ETSI RRS may specify a standard set of control interfaces for each user-defined function block to be implemented properly via the standard set of control interfaces. Specification of the standard control interfaces for user-defined function blocks may be given in the document of Protocol/Interface technical specification (TS). The radio platforms shown in FIGS. 5 and 6 generally comprise both core(s) and dedicated hardware accelerator(s) for implementing each of function blocks.

As shown in FIG. 6, the operational structure of unified radio applications may comprise the following components.

The radio application includes SFB(s) and UDFB(s) in accordance with the contents of metadata in a given Radio Application Package (RAP). Baseband Interface (BBI) represents each function block itself by specifying the name of the corresponding function block. Also, BBI specifies interface related to the corresponding function blocks as mentioned earlier.

Radio Library (normative implementation) contains configcodes of SFBs that are to be implemented on core processor(s) while the SFBs that are to be implemented using dedicated hardware logic accelerator(s) are supported by Radio HAL.

UDFB Set includes all the UDFBs to be used in a given RAP and is in general provided by RA provider. UDFB is included in RAP together with metadata and RC code. Since UDFB is generally a modified and/or extended version of SFB, UDFB may have a dependency on SFB library(-ies).

The radio HAL is to abstract radio platform. The radio HAL supports SFB to be implemented using dedicated hardware logic accelerator in order for each of those SFBs to be implemented directly on corresponding dedicated hardware logic accelerator(s).

The radio platform driver is for the radio OS to recognize the radio platform.

The radio platform in general consists of both core(s) and dedicated hardware accelerator(s).

Figure 7:
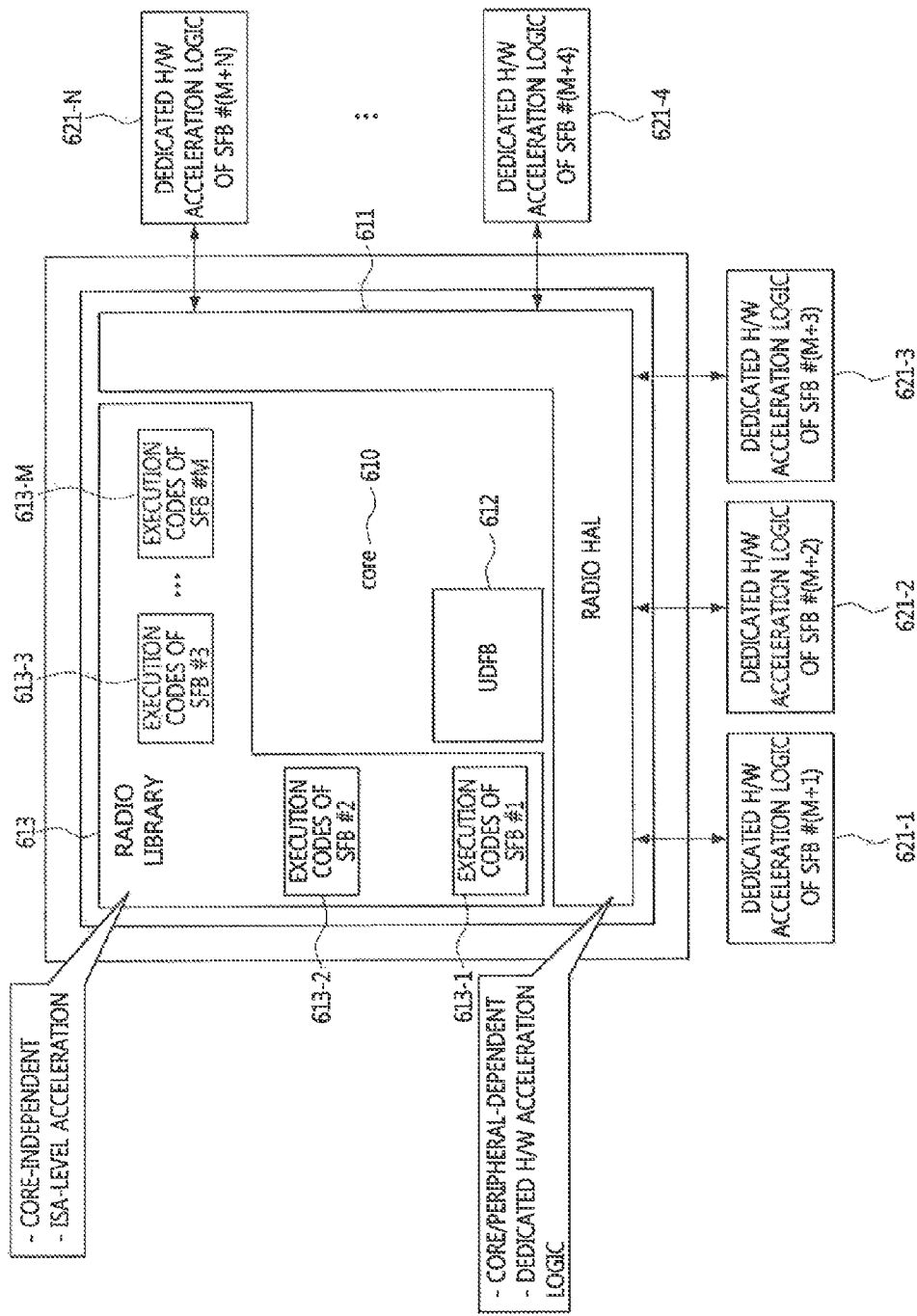
FIG. 7 is a conceptual diagram to explain implementations of function block libraries of a given radio platform according to the present invention.

FIG. 7 is a conceptual diagram to explain implementations of function block libraries of a given radio platform according to the present invention. Referring to FIG. 7, illustrated are implementations of function blocks on a given radio platform which consists of core(s) and various kinds of peripheral devices.

In the example shown in FIG. 7, the number of standard function blocks implemented on a core processor has been set to M and the number of standard function blocks implemented on dedicated hardware logic accelerators has been set to N. As mentioned earlier, standard function blocks to be implemented using dedicated hardware logic accelerator such as FFT, Turbo decoder, Multi-Input-Multi-Output (MIMO) decoder, etc. can be implemented directly on the corresponding dedicated hardware logic accelerator for high performance and low power consumption. Those standard function blocks are supported by the radio HAL for implementation on the dedicated accelerator(s). This means that, when each of standard function blocks to be implemented on the dedicated accelerator is called in a radio application, it is executed directly on the corresponding dedicated accelerator through the radio HAL. Similarly, when each of standard function blocks to be implemented on core processor such as bit-reverse, multiply and accumulation, etc., is called in RA, it is executed on a given core (e.g. ARM with Neon).

Consequently, the execution codes required on a radio processor consists of the following two parts. One part is execution codes for standard function blocks executed on programmable core(s) and the other part is radio HAL codes for standard function blocks implemented on dedicated accelerators.

This can be summarized as follows. {C: execution code required on RP for SFB implementation}={A: execution codes for SFBs implemented on programmable cores}+{B: Radio HAL codes for SFBs implemented on accelerators}. That is, C=A+B where A and B may be determined by each vendor.

This may also mean that: {SFBs}={SFBs implemented on core processor} {SFBs implemented on dedicated hardware accelerators} and {SFBs implemented on core processor} {SFBs implemented on dedicated hardware accelerators}=.

Meanwhile, UDFB, as mentioned earlier, should be written with standard interfaces. As shown in FIG. 7, it should be observed that the standard interfaces of UDFB might be associated with either SFB(s) implemented on core processor or SFB(s) implemented on dedicated hardware accelerator, or both.

The reason why we classify standard interfaces into two groups, i.e. the one corresponding to SFB(s) implemented on core processor and the other corresponding to SFB(s) implemented on dedicated hardware accelerator, is that each category has its own pros and cons. The latter, since it is implemented on dedicated hardware logic, is advantageous for power consumption, speed-up operation, and, probably, cost-effectiveness. On the contrary, the former, since it is implemented on microprocessor, is advantageous mainly for flexibility. It is expected that the dedicated hardware accelerator(s) will be used relatively more widely at the beginning stage until programmable devices become competitive to dedicated hardware devices in performance. As semiconductor technology evolves more and more, the core-dependent SFB will gradually become more and more dominant compared to the core-and-peripheral-dependent SFB in a long term standpoint and be implemented via Instruction Set Architecture (ISA)-level acceleration.

The granularity of the standard function blocks shown in the present specification are just for the purpose of explanation, and the standard function block interfaces may be defined in other documents, as mentioned earlier.

Software Architecture Reference Points

Hereinafter, procedures of interfacing between a radio control framework and a radio application for embodying installation/uninstallation, creating/deleting of instances, and operations of the unified radio application will be explained as examples.

Figure 8:
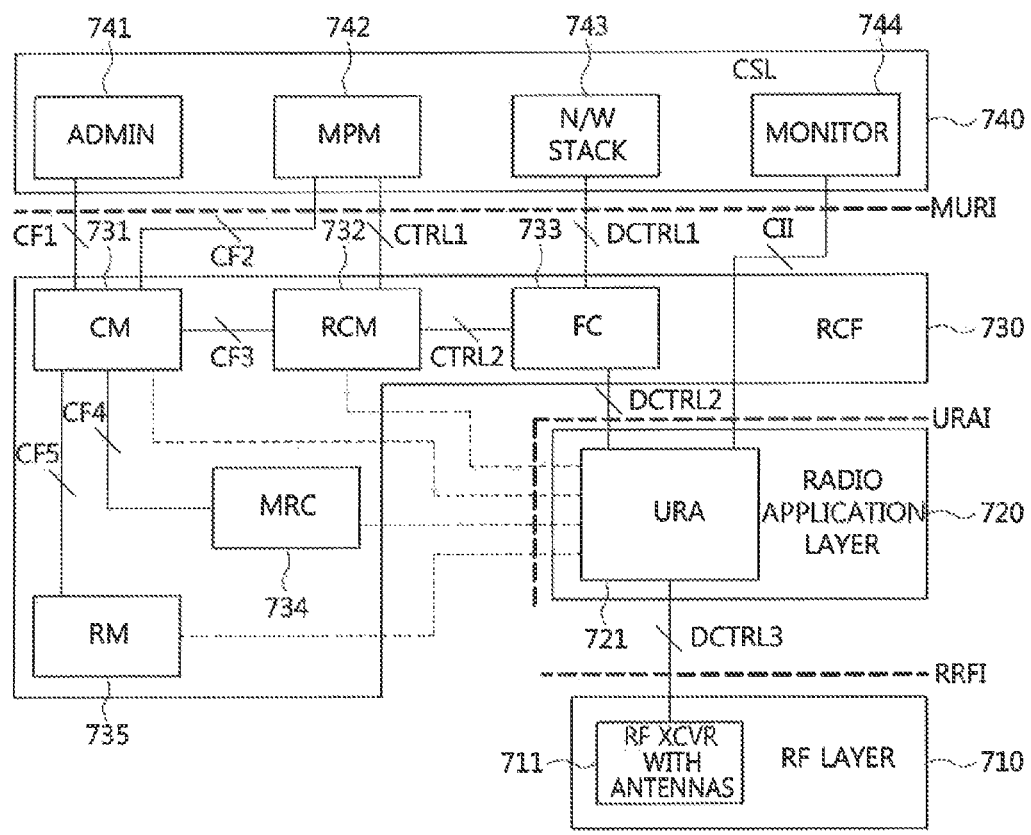
FIG. 8 is a diagram illustrating an overall architecture of a mobile device with all reference points specified in between corresponding components.

FIG. 8 is a diagram illustrating an overall architecture of a mobile device with all reference points specified in between corresponding components.

In FIG. 8, each solid line between two blocks denotes a reference point defined between the two blocks through which direct interactions between the two blocks are performed. Also, each dotted line between two blocks denotes that interactions between the two blocks is performed through radio OS based on commands issued by a corresponding block. As will be explained later, blocks in RCF (i.e. CM, RCM, MRC, and RM) issue the command for the interaction to take place at the unified radio application through the radio OS.

The definition of each reference point is based on the three kinds of interfaces—MURI which are interfaces between components of communication services layer and those of RCF, URAI which are interfaces between URA and component of RCF, and Reconfigurable Radio Frequency Interfaces (RRFI) which are interfaces between URA and Radio Frequency (RF) part. In addition to MURI, URAI, and RRFI, interfaces between components of RCF have also been defined as reference points. In the present document, we classify the reference points according to procedures of their functions such that the classification of each of the reference points becomes coincident with each of the procedures which will be described later.

1) Reference Point 1: Interfaces for Installation/Uninstallation and Creating/Deleting Instance of Radio Application FIG. 9 is a diagram illustrating reference points for installation/uninstallation and creating/deleting an instance of a radio application.

Figure 9:
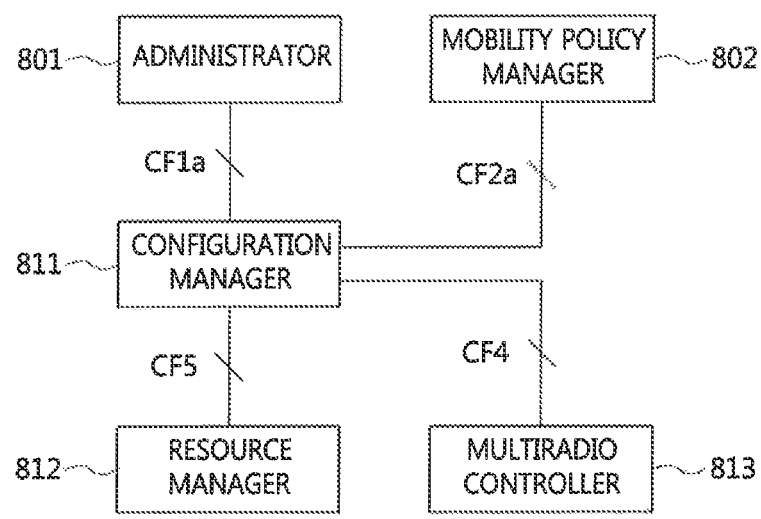
FIG. 9 is a diagram illustrating reference points for installation/uninstallation and creating/deleting an instance of a radio application.

Referring to FIG. 9, CF1a is an interface between an administrator and a configuration manager (CM), which is for the administrator to request CM to perform installing, uninstalling of RA or for the administrator to receive response of the request from CM.

CF2a is an interface between a mobility policy manager (MPM) and CM, which is for MPM to request CM to perform creating instance or deleting instance of RA or for MPM to receive response of the request from CM.

CF4 is an interface between CM and a multiradio controller (MRC), which is for CM to request MRC to send parameters related to radio resources to CM, or for CM to receive response of the request (i.e. the parameters related to radio resources) from MRC during the procedure of creating instance of RA.

CF5 is an interface between CM and a resource manager (RM), which is for CM to request RM to send parameters related to computational resources to CM, or for CM to receive response of the request (i.e. the parameters related to computational resources) from RM during the procedure of creating instance of RA.

2) Reference Point 2: Interfaces for List Checking of Radio Applications

Figure 10:
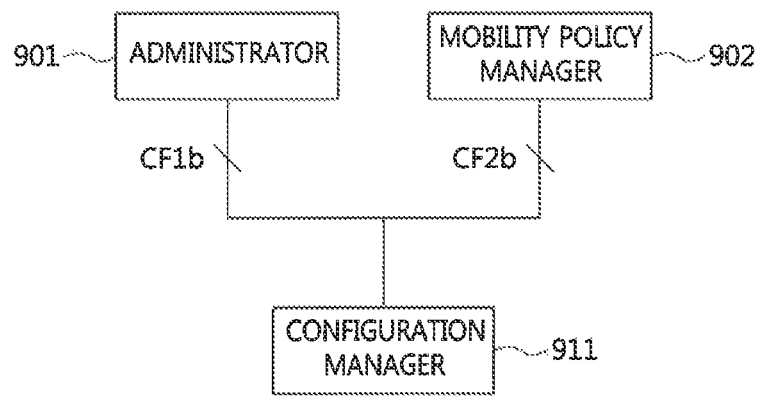
FIG. 10 is a diagram illustrating reference points for obtaining lists of radio applications.

FIG. 10 is a diagram illustrating reference points for obtaining lists of radio applications.

Referring to FIG. 10, CF1b is an interface between the administrator and CM, which is for the administrator to request CM to send the RA list to Administrator, or for Administrator to receive response of the request (i.e. the RA list) from CM.

Reference Point CF2b is an interface between MPM and CM, which is for MPM to request CM to send the RA list to MPM, or for MPM to receive response of the request (i.e. the RA list) from CM.

3) Reference Point 3: Interfaces for Activation/Deactivation of Radio Application.

Figure 11:
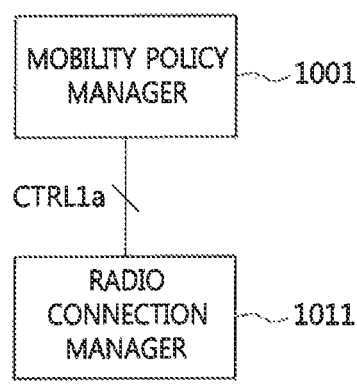
FIG. 11 is a diagram illustrating reference points for activation/deactivation of radio application.

FIG. 11 is a diagram illustrating reference points for activation/deactivation of radio application.

Referring to FIG. 11, CTRL1a is an interface between the MPM and a radio connection manager (RCM), which is for MPM to request RCM to perform activation/deactivation of radio applications, or for MPM to receive response of the request (i.e. activation/deactivation of RA) from RCM.

4) Reference Point 4: Interfaces for Transferring Context Information

Figure 12:
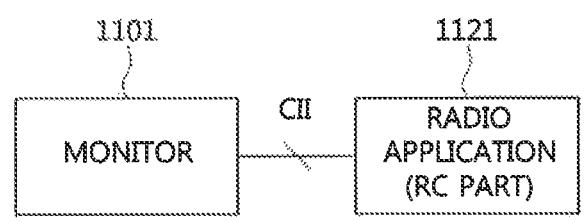
FIG. 12 is a diagram illustrating reference points for transferring context information.

FIG. 12 is a diagram illustrating reference points for transferring context information.

Referring to FIG. 12, CII is an interface between Monitor and RC in RA, which is for Monitor to request RC in RA to send context information to Monitor, or for Monitor to receive response of the request (i.e. the context information) from RC in RA.

The context information is generated from corresponding function block(s) of RA(s) and transferred to RC. There should be interfaces between RC within a radio application and each of corresponding function blocks. This means that BBI for transferring context information between the RC and each of the corresponding function blocks should be defined.

5) Reference Point 5: Interfaces for Creating Data Flow and Sending/Receiving User Data FIG. 13 is a diagram illustrating reference points for creating data flow and sending/receiving user data.

Figure 13:
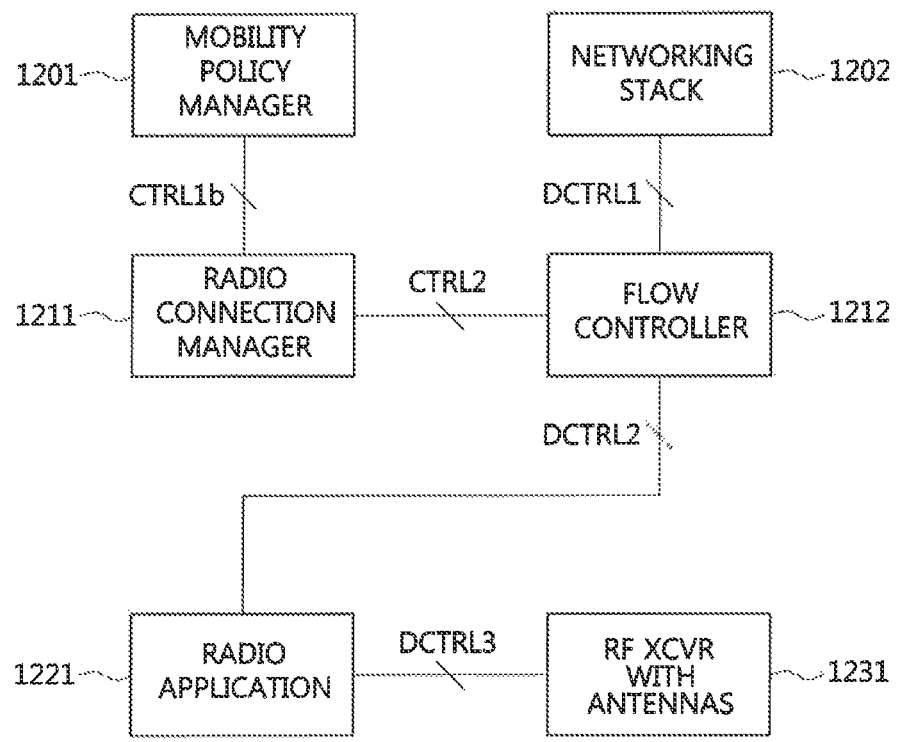
FIG. 13 is a diagram illustrating reference points for creating data flow and sending/receiving user data.

Referring to FIG. 13, CTRL1b is an interface between MPM and RCM, which is for MPM to request RCM to form data flow or network association with peer equipment, or for MPM to receive response of the request from RCM.

Reference Point CTRL2 is an interface between RCM and FC, which is for RCM to request FC to form data flow, or for RCM to receive response of the request from FC.

Reference Point DCTRL1 is an interface between FC and Networking stack, which is for FC to receive/transfer user data from/to Networking stack for the procedure of sending/receiving data. It also includes an acknowledgement of transmit user data from FC to Networking stack upon completion of sending data. It also includes an acknowledgement of transmit user data from FC to Networking stack upon completion of sending data.

Reference Point DCTRL2 is an interface between FC and RA, which is for FC to transfer the transmit user data to RA and to request RA to transfer the information of transmit user data such as throughput, data bandwidth, etc. to FC. DCTRL2 interface is also used for FC to receive response of the request from RA. In the case of the procedure of receiving data, DCTRL2 interface is used to transfer the receive user data from RA to FC.

Reference Point DCTRL3 is an interface between RA and RF transceiver (XCVR) with antenna(s), which is for RA to receive/transfer receive/transmit user data from/to RF XCVR with antenna.

Procedures

Figure 14:
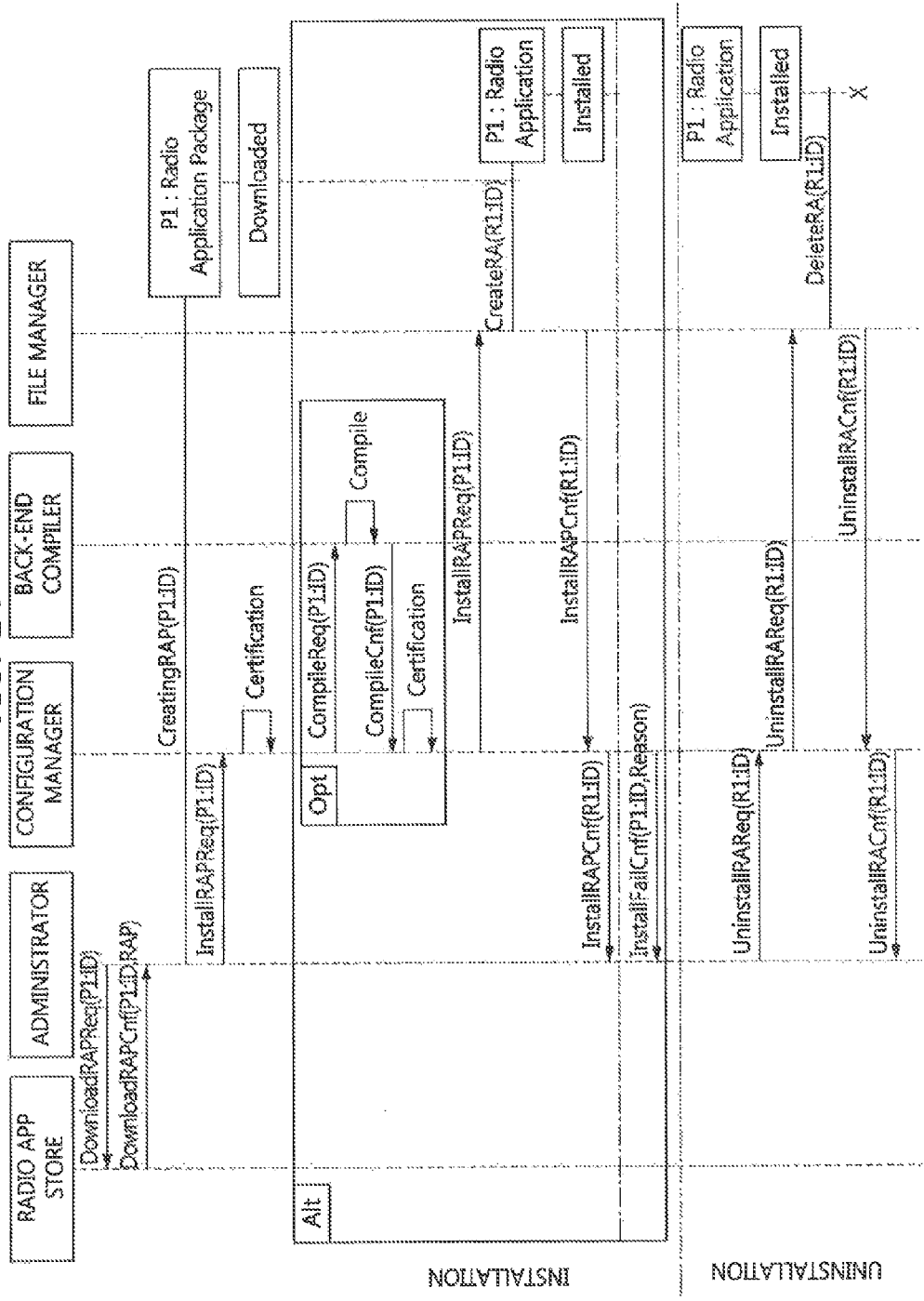
FIG. 14 is a diagram illustrating signaling associated with the installation and uninstallation of radio application.

1) Procedures for Installation/Uninstallation and Creating/Deleting Instance of Radio Application FIG. 14 is a diagram illustrating signaling associated with the installation and uninstallation of radio application.

Referring to FIG. 14, the procedure of installing radio applications can be described as follows.

The administrator sends a DownloadRAPReq signal including a RAP identification (ID) to a radio apps store.

The administrator receives the DownloadRAPCnf signal including RAP ID and RAP from the radio apps store.

The administrator sends an InstallRAReq signal including RAP ID to CM to request radio application installation.

CM first performs the procedure of certifying the RA code in order to verify its compatibility, authentication, etc.

The CM sends an InstallRAReq signal including RAP ID to File Manager (FM) to perform installation of RA.

FM performs installation of RA and transfers InstallRACnf signal including RA ID to CM, which transfers InstallRACnf signal including RA ID to Administrator.

In the case when the downloaded RA is IR, CM first sends CompileReq signal including RAP ID to Back-end Compiler in advance of RA installation. After completion of back-end compilation, Back-end Compiler transfers CompileCnf signal including RAP ID to CM, which performs the procedure of certifying usability of the back-end compiled RA code.

In the case of installation failure, CM reports Administrator the failure of RA installation using InstallRAFailCnf signal including RAP ID and failure reason.

Referring to FIG. 14, the procedure of uninstalling radio applications can be described as follows.

The administrator transfers an UninstallRAReq signal including ID of RA to be uninstalled to CM.

The CM sends an UninstallRAReq signal including RA ID to FM.

FM performs uninstallation of RA and transfers UninstallRACnf signal including RA ID as an acknowledgement of uninstallation completion to CM.

The CM sends an UninstallRACnf signal including RA ID to Administrator.

Figure 15:
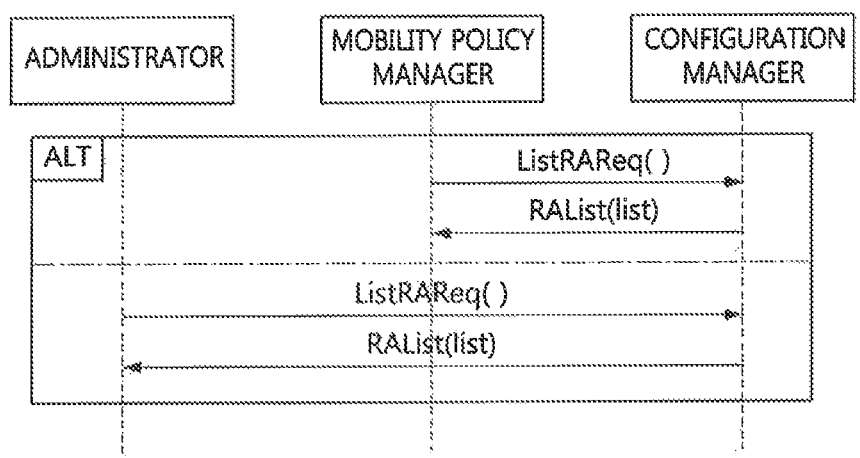
FIG. 15 is a diagram illustrating signaling associated with the procedure of creating/deleting instance of radio application.

FIG. 15 is a diagram illustrating signaling associated with the procedure of creating/deleting instance of radio application.

Referring to FIG. 15, the procedure creating instance of radio application can be described as follows.

For creating instance of installed RA, MPM transfers InstantiateRAReq signal including ID of RA to be instantiated to CM.

The CM transfers a RMParameterReq signal and a MRCParameterReq signal including ID of RA to get parameters needed for RA activation (e.g. Forward Error Correction (FEC) parameters, MIMO parameters, bandwidth, etc.) to RM and MRC.

The CM receives an RMParameterCnf signal including ID of RA and radio resource parameters from RM.

The CM receives a MRCParameterCnf signal including ID of RA and computational resource parameters from MRC.

Upon completion of receiving parameters needed for RA activation, the CM transfers RA ID and the parameters for performing the RA instantiation to the radio OS.

Upon completion of creating instance, the CM transfers an InstantiateRACnf signal including RA ID to MPM.

When the CM fails to get parameters needed for RA activation from RM and/or MRC, RM and/or MRC reports the failure of parameters transfer to the CM using RMParameterFailCnf and/or MRCParameterFailCnf, respectively.

If the creating instance of RA fails, i.e. CM receives RMParameterFailCnf and/or MRCParameterFailCnf signal, CM reports the instantiation failure to MPM using InstantiateRAFailCnf signal.

Referring to FIG. 15, the procedure of deleting instance of radio application can be described as follows.

MPM transfers ID of RA to be deleted using a DeInstantiateRAReq signal to CM.

Upon the request of the CM for the radio OS to perform deleting instance of RA, the radio OS deletes the instance of designated RA.

Upon completion of deleting instance, the CM acknowledges deleting instance of RA to MPM using a DeInstantiateRACnf signal.

2) Procedures for List Checking of Radio Application(s)

Figure 16:
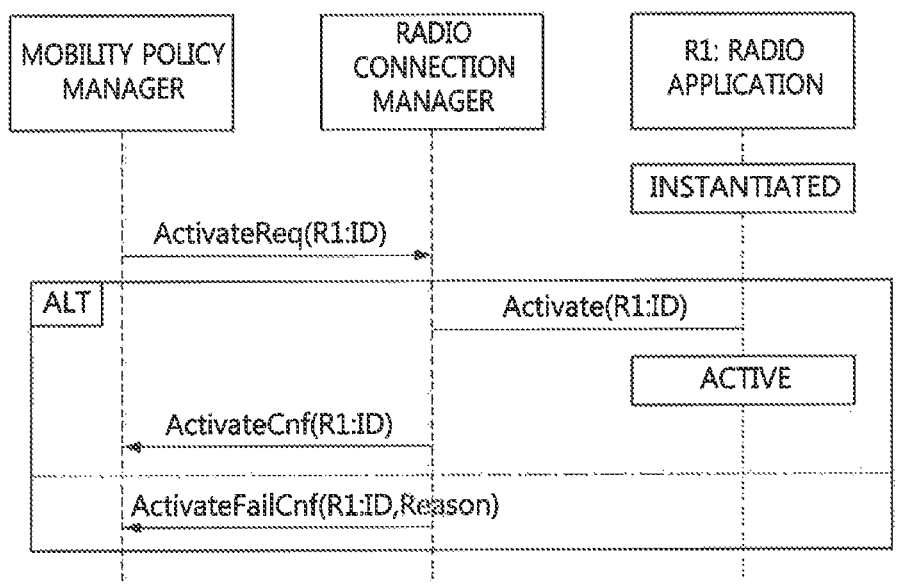
FIG. 16 is a signaling diagram illustrating a procedure of listing radio applications.

FIG. 16 is a signal diagram illustrating a procedure of lint checking of radio applications.

Referring to FIG. 16, the procedure of checking the list of installed/instantiated/active radio applications can be described as follows.

The administrator or MPM transfers a ListRAReq signal to CM for obtaining the radio application list.

The CM transfers RA list information to the administrator or MPM using an RAList signal.

3) Procedures for Activation/Deactivation of RA

Figure 17:
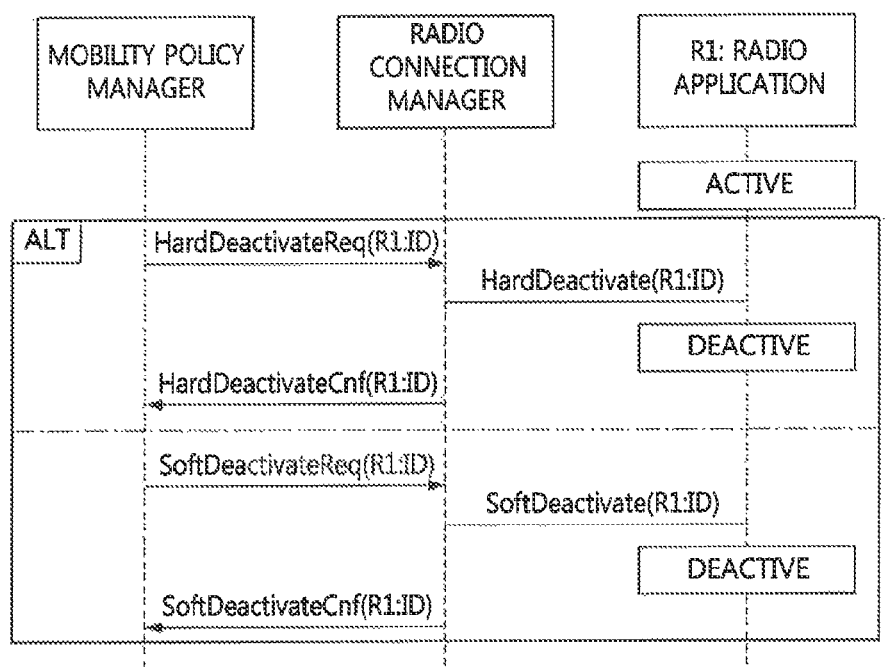
FIG. 17 is a signaling diagram illustrating a procedure of activating radio application.

FIG. 17 is a signaling diagram illustrating a procedure of activating radio application.

Referring to FIG. 17, the procedure of activating radio application can be described as follows.

The MPM transfers an ActivateReq signal including ID of RA to request RA activation to RCM.

Upon the request of the RCM for the radio OS to perform RA activation, ROS activates the designated RA.

After the radio OS completes the activation of RA, RCM acknowledges the completion of RA activation by sending ActivateCnf signal to MPM.

If RA activation is failed, RCM reports the failure of RA activation to MPM by transferring the failed RA ID and failure reason in ActivateFailCnf signal.

Figure 18:
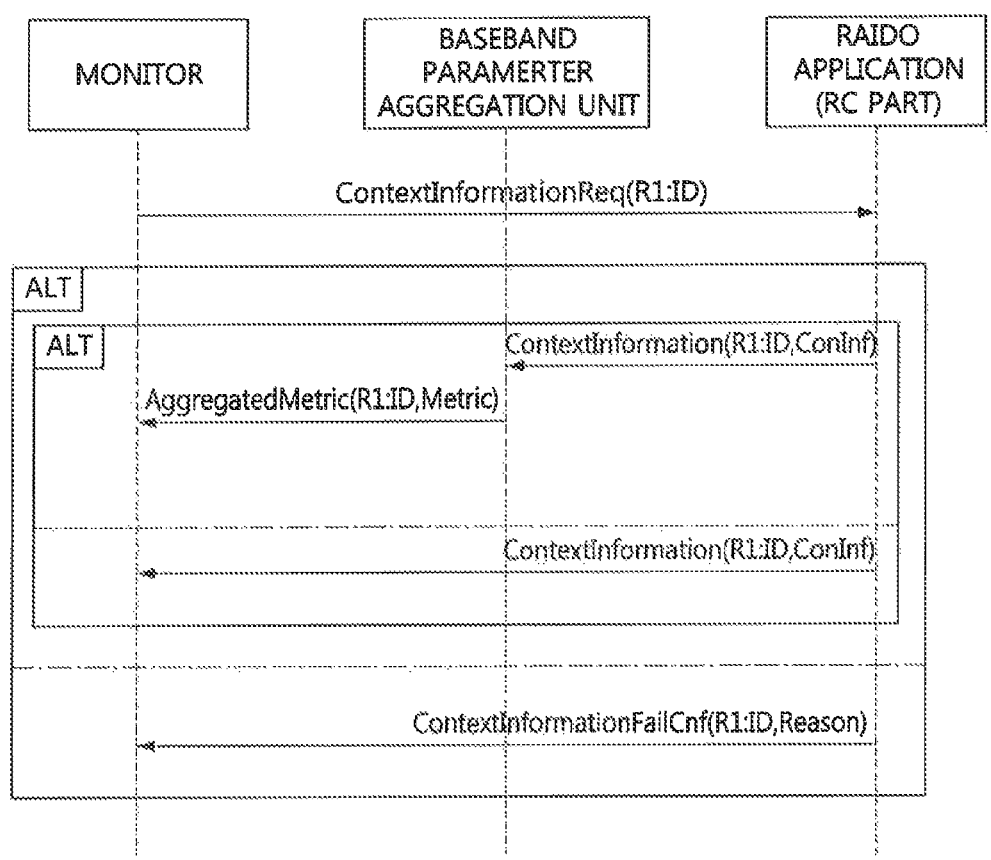
FIG. 18 is a signaling diagram illustrating a procedure of deactivating radio application.

FIG. 18 is a signaling diagram illustrating a procedure of deactivating radio application.

Referring to FIG. 18, the procedure of deactivating radio application can be described as follows.

In the case of hard deactivation, MPM transfers a HardDeactivateReq signal including ID of RA to request hard deactivation of the designated RA to RCM.

Upon the request of RCM for the radio OS to perform hard deactivation of RA, the radio OS deactivates the designated RA.

After the radio OS completes the hard deactivation of RA, RCM acknowledges the completion of hard deactivation of RA by sending a HardDeactivateCnf signal to MPM.

Meanwhile, in the case of soft deactivation, MPM transfers a SoftDeactivateReq signal including ID of RA to request soft deactivation of the designated RA to RCM.

Upon the request of RCM for the radio OS to perform soft deactivation of RA, the radio OS deactivates the designated RA.

After the radio OS completes the soft deactivation of RA, RCM acknowledges the completion of soft deactivation of RA by sending SoftDeactivateCnf signal to MPM.

4) Procedures for Transferring Context Information

Figure 19:
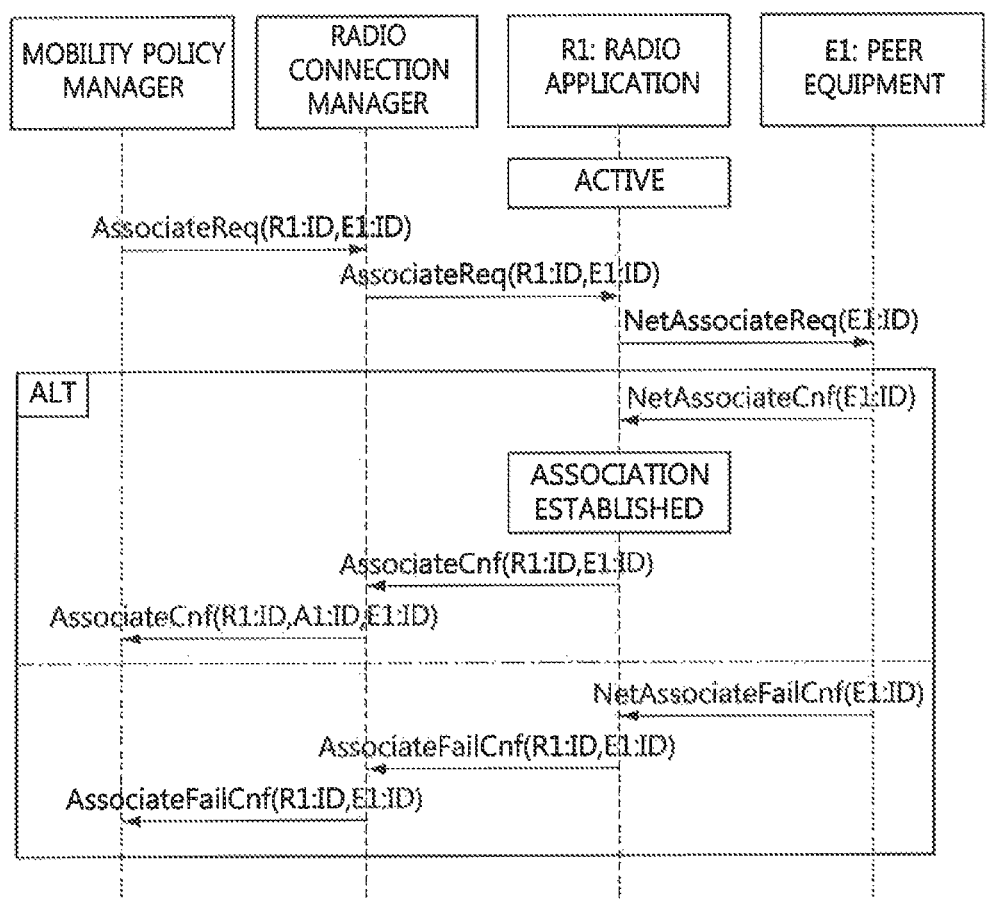
FIG. 19 is a signaling diagram illustrating a procedure of transferring context information.

FIG. 19 is a signaling diagram illustrating a procedure of transferring context information.

Referring to FIG. 19, a procedure for a radio application to transfer context information to a monitor or a baseband parameter aggregation (BPA) unit can be described as follows.

The monitor transfers a ContextInformationReq signal including RA ID to RC in RA.

The RC in the radio application transfers a ContextInformation signal including RA ID and context information generated in corresponding function block(s) in RA to the monitor.

In the case of using the BPA unit, RC of the radio application transfers a ContextInformation signal including RA ID and context information to the BPA unit. Then, the BPA unit aggregates and compresses the context information to minimize the bandwidth occupied by the context information to be transferred. Upon completion of the procedure of context information aggregation and compression, the BPA unit transfers an AggregatedMetric signal including RA ID and aggregated metric(s) to the monitor.

In the case of generating context information failure, RC of the radio application transfers a ContextInformationFailCnf signal including to RA ID and failure reason to the monitor.

Figure 20:
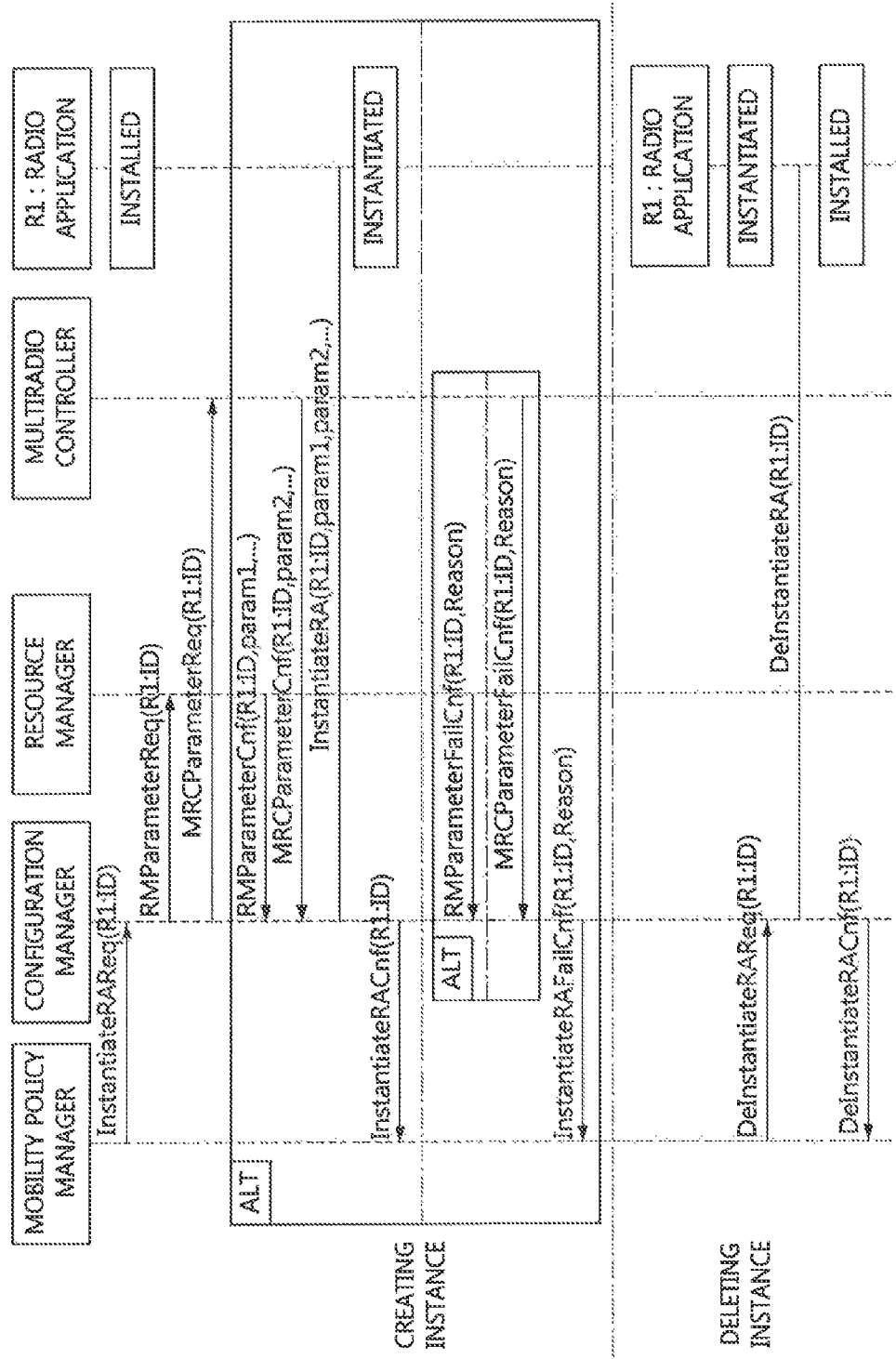
FIG. 20 is a signaling diagram illustrating a procedure of creating a network association.

5) Procedure for Creating Data Flow and Sending/Receiving User Data FIG. 20 is a signaling diagram illustrating a procedure of creating a network association.

Referring to FIG. 20, the procedure of creating a network association can be described as follows.

The MPM transfers an AssociateReq signal including RA ID and peer equipment ID to RCM. The peer equipment may be Wireless Local Area Network (WLAN) access point(s), Internet Protocol (IP) access node(s) (such as Gateway General Packet Radio Service (GPRS) Support Node (GGSN), etc.) in cellular networks, or Bluetooth headset, digital radio/television broadcasting station(s), Global Positioning System (GPS) satellite(s), etc.

Upon the request of the RCM for the radio OS to perform creating the network association, the radio OS transfers an AssociateReq signal from RCM to RA. Then, the radio application transfers ID of corresponding peer equipment using a NetAssociateReq signal.

Upon completion of creating the network association, the peer equipment transfers a NetAssociateCnf signal to the radio application. Then, the radioOS transfers an AssociateCnf signal to RCM, which transfers the AssociateCnf signal to MPM.

In the case of creating the network association failure, the peer equipment transfers a NetAssociateFailCnf signal to the radio application. Then, the radioOS transfers an AssociateFailCnf signal to RCM, which transfers the AssociateFailCnf signal to MPM.

Figure 21:
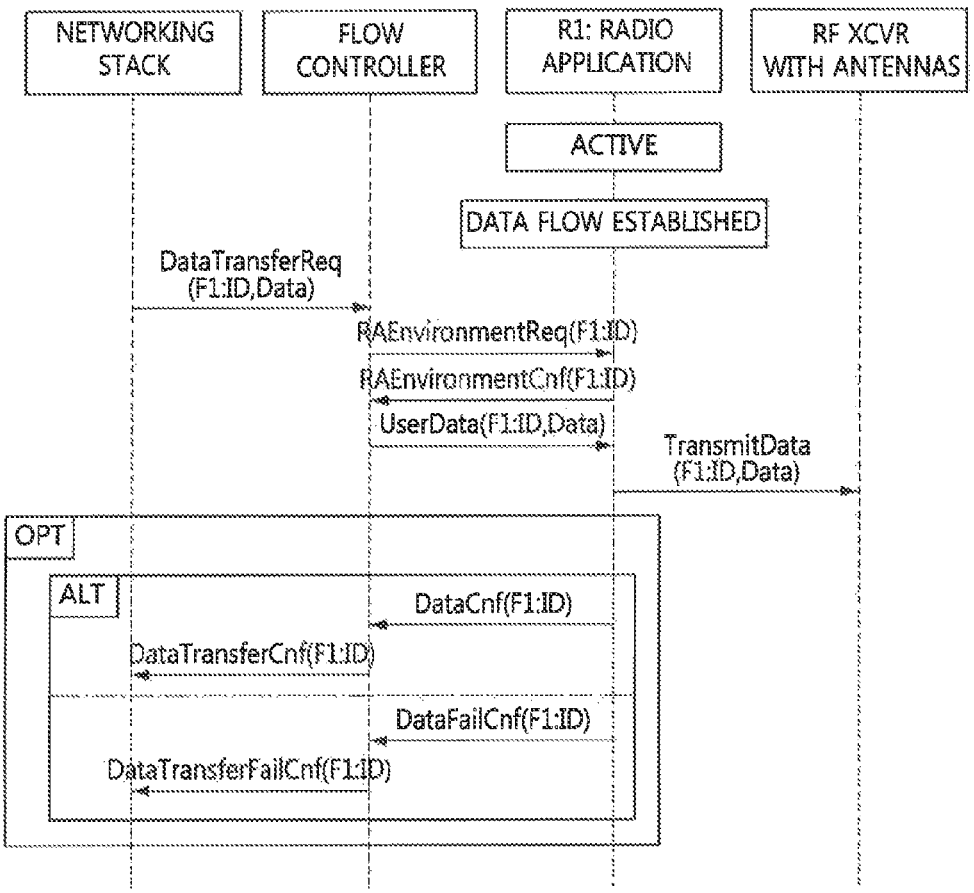
FIG. 21 is a signaling diagram illustrating a procedure of connecting a logical radio link association.

FIG. 21 is a signaling diagram illustrating a procedure of connecting a logical radio link association.

Referring to FIG. 21, a procedure of creating a logic radio link association may be described as follows.

The MPM transfers a CreateDataFlowReq signal to RCM including peer equipment ID, active RA ID, and user ID in order to associate a logical radio link with another mobile device (MD).

The RCM requests the radio OS to create a data flow using a CreateDataFlowReq signal including peer equipment ID, active RA ID, user ID and another MD user ID. The radio application transfers corresponding user ID, another MD user ID, and peer equipment ID using a LogicalRadioLinkReq signal to the peer equipment.

Upon receiving a LogicalRadioLinkReq signal including user ID and another MD user ID from the peer equipment, the network transfers a LogicalRadioLinkCnf signal including a logical link ID to the peer equipment.

Upon transferring the LogicalRadioLinkCnf signal including the logical link ID from the peer equipment to the radio application, the radio OS transfers a CeateDataFlowCnf signal including a network association ID, the RA ID, and the logical link ID to RCM.

In order to set up data flow, the RCM transfers a CreateFlowReq signal including the network association ID and the RA ID to FC. After creating the data flow, FC transfers a CreateFlowCnf signal including the network association ID, the RA ID, and the created data flow ID to RCM.

The RCM transfers a CreateDataFlowCnf signal including the network association ID, the RA ID, and the data flow ID to MPM.

When the radio application receives the LogicalRadioLinkRej signal from the peer equipment, the radio OS transfers a CreateDataFlowFailCnf signal including the network association ID and failure reason to RCM. The RCM transfers the CreateDataFlowFailCnf signal to MPM to acknowledge the failure of creating the data flow.

Figure 22:
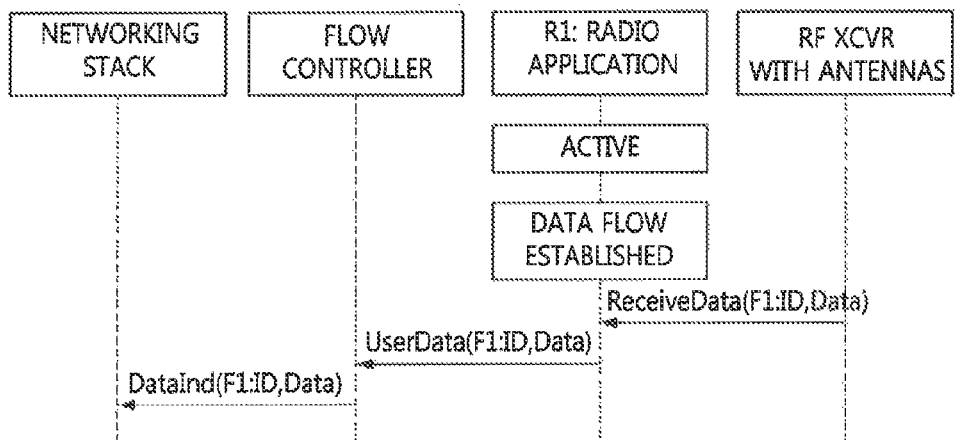
FIG. 22 is a signaling diagram illustrating a procedure of sending data.

FIG. 22 is a signaling diagram illustrating a procedure of sending data.

Referring to FIG. 22, a procedure of sending data can be described as follows.

A networking stack transfers a DataTransferReq signal together with a data flow ID and user data to FC in order to transfer the user data.

The FC transfers an RAEnvironmentReq signal to the radio application in order to request information about the user data to be transferred to the radio application such as throughput, data bandwidth, etc.

The radio application transfers environmental information using an RAEnvironmentCnf signal to FC.

Upon receiving the RAEnvironmentCnf signal including the data flow ID, FC transfers a UserData signal together with the data flow ID and the user data to the radio application.

The radio application transfers the user data including the data flow ID using a TransmitData signal to RF XCVR.

After completion of sending data, the radio application acknowledges the completion of sending user data by transferring a DataCnf signal to FC.

Upon receiving the DataCnf signal, FC transfers a DataTransferCnf signal together with the data flow ID to the networking stack.

In the case of sending data failure, the radio application reports the failure of sending data to FC by transferring a DataFailCnf signal including the data flow ID.

Upon receiving the DataCnf signal, FC transfers a DataTransferCnf signal together with the data flow ID to the networking stack.

Figure 23:
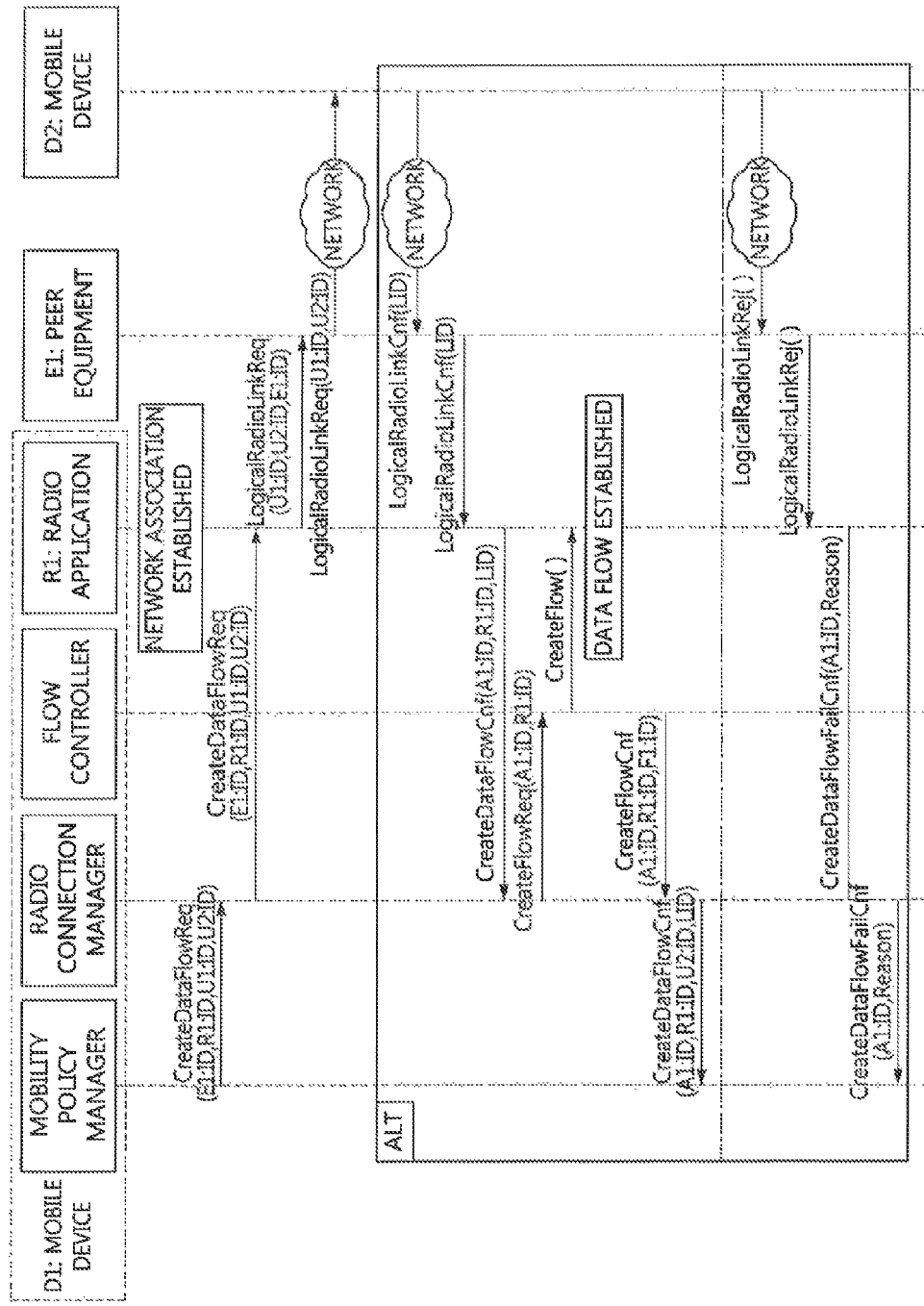
FIG. 23 is a signaling diagram illustrating a procedure of receiving data.

FIG. 23 is a signaling diagram illustrating a procedure of receiving data.

Referring to FIG. 23, a procedure of receiving data can be described as follows.

The RF XCVR with antenna transfers received user data including data flow ID using an ReceiveData signal to the radio application.

The radio application transfers a UserData signal including the data flow ID and the user data to FC after decoding the data received from the RF XCVR with antenna.

The FC transfers a DataInd signal including the data flow ID and the user data received from the radio application to the networking stack.

While the example embodiments of the present invention and their advantages have been described in detail, it should be understood that various changes, substitutions and alterations may be made herein without departing from the scope of the invention.

The invention claimed is:

1. A method of operating a radio application in a radio processor layer of a terminal having a radio processor, the method comprising:
   determining whether a shadow radio platform to which the radio application is targeted is identical to a real radio platform of the terminal; and
   when the shadow radio platform is identical to the real radio platform of the terminal, executing configuration codes of the radio application in the radio processor.

2. The method of claim 1, wherein the configuration codes include user-defined function block codes for configuring user-defined function blocks of the radio application, and a radio library for configuring standard function blocks used by the radio application in form of execution codes executable on the real radio platform.

3. The method of claim 2, wherein at least part of the standard function blocks are implemented as dedicated hardware logics executed by the radio application through a hardware abstraction layer (HAL) of the radio processor layer.

4. The method of claim 1, further comprising downloading a radio application package including the configuration codes of the radio application from a server.

5. The method of claim 1, wherein the radio application operates on at least one of the radio processor and an application processor of the terminal and interworks with a radio control framework providing the radio application with operation environments.

6. The method of claim 5, wherein the radio control framework includes at least one of:
   a configuration manager (CM) performing installation/uninstallation of the radio application and creating/deleting an instance of the radio application and managing radio parameters for the radio application;
   a radio connection manager (RCM) performing activation/deactivation of the radio application and managing user data flow switching between radio applications:
   a flow controller (FC) controlling sending/receiving and flows of user data packets;
   a multi-radio controller (MRC) scheduling requests for spectrum resources issued by radio applications; and
   a resource manager (RM) sharing radio resources with radio applications.

7. A method of operating a radio application in a radio processor layer of a terminal having a radio processor, the method comprising:
   determining whether a shadow radio platform to which the radio application is targeted is identical to a real radio platform of the terminal; and
   when the shadow radio platform is different from the real radio platform of the terminal, executing configuration codes of the radio application in the radio processor by compiling the configuration codes through a radio virtual machine (RVM).

8. The method of claim 7, wherein the configuration codes include user-defined function block codes for configuring user-defined function blocks of the radio application in intermediate representation (IR) form which can be converted into execution codes executable on the real radio platform.

9. The method of claim 7, wherein the RVM includes a just-in-time (JIT) compiler which compiles the configuration codes into execution codes of the real radio platform.

10. The method of claim 7, wherein the RVM includes an ahead-of-time (AOT) compiler which compiles the configuration codes into execution codes of the real radio platform.

11. The method of claim 7, wherein the terminal has native implementations of standard function blocks in the radio processor layer.

12. The method of claim 7, wherein the terminal has standard function blocks implemented as dedicated hardware logics executed by the radio application through a hardware abstraction layer (HAL) of the radio processor layer.

13. The method of claim 7, further comprising downloading a radio application package including the configuration codes of the radio application from a server.

14. The method of claim 7, wherein the radio application operates on at least one of the radio processor and an application processor of the terminal and interworks with a radio control framework providing the radio application with operation environments.

15. The method of claim 14, wherein the radio control framework includes at least one of:
- a configuration manager (CM) performing installation/uninstallation of the radio application and creating/deleting an instance of the radio application and managing radio parameters for the radio application;
- a radio connection manager (RCM) performing activation/deactivation of the radio application and managing user data flow switching between radio applications;
- a flow controller (FC) controlling sending/receiving and flows of user data packets;
- a multi-radio controller (MRC) scheduling requests for spectrum resources issued by radio applications; and
- a resource manager (RM) sharing radio resources with radio applications.

* * * * *